(12) United States Patent
Woelfel et al.

(10) Patent No.: US 12,696,368 B2
(45) Date of Patent: Jul. 28, 2026

(54) RAY DEVICE, X-RAY DEVICE AND COMPUTER PROGRAM PRODUCT

(71) Applicant: Siemens Healthineers AG, Forchheim (DE)

(72) Inventors: Stefan Woelfel, Dormitz (DE); Thomas Hofmann, Grossenseebach (DE); Andreas Kretschmann, Langensendelbach (DE); Bjoern Kreisler, Hausen (DE); Reiner Christ, Nuremberg (DE); Marcel Maage, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 0 days.

(21) Appl. No.: 19/201,152

(22) Filed: May 7, 2025

(65) Prior Publication Data

US 2025/0351253 A1     Nov. 13, 2025

(30) Foreign Application Priority Data

May 8, 2024     (DE) ..................... 10 2024 204 327.3

(51) Int. Cl.
H05G 1/02     (2006.01)
G05D 23/19     (2006.01)

(52) U.S. Cl.
CPC ......... H05G 1/025 (2013.01); G05D 23/1917 (2013.01)

(58) Field of Classification Search
CPC .... G05D 23/00; G05D 23/19; G05D 23/1917; H05G 1/02; H05G 1/025; A61B 6/032; A61B 6/035; A61B 6/44; A61B 6/4429; A61B 6/4441; A61B 6/4488
See application file for complete search history.

(56) References Cited

U.S. PATENT DOCUMENTS

| | | | |
|---|---|---|---|
| 2013/0037251 A1 | 2/2013 | Joshi et al. | |
| 2024/0407743 A1 | 12/2024 | Burbar et al. | |
| 2025/0241605 A1* | 7/2025 | Langseder ........... | A61B 6/4488 |

FOREIGN PATENT DOCUMENTS

| | | |
|---|---|---|
| CN | 102949202 A | 3/2013 |
| CN | 105105782 A | 12/2015 |
| CN | 117580508 A | 2/2024 |
| DE | 102014201741 A1 | 8/2015 |
| DE | 102015008975 A1 | 1/2017 |

OTHER PUBLICATIONS

German Office Action and English translation thereof for German Application No. 10 2024 204 327.3 mailed Feb. 10, 2025.
German Decision to Grant and English translation thereof for German Application No. 10 2024 204 327.3 mailed Jun. 23, 2025.

* cited by examiner

*Primary Examiner* — Jurie Yun
(74) *Attorney, Agent, or Firm* — Harness, Dickey & Pierce, P.L.C.

(57)     ABSTRACT

One or more example embodiments relates to a method for controlling the temperature of an X-ray device, comprising detecting a heating parameter of a heating element, identifying a target heating parameter for the heating element, and adjusting a fluid supply parameter of a fluid supply unit as a function of a comparison of the heating parameter and the target heating parameter.

20 Claims, 3 Drawing Sheets

RAY DEVICE, X-RAY DEVICE AND COMPUTER PROGRAM PRODUCT

CROSS-REFERENCE TO RELATED APPLICATION(S)

The present application claims priority under 35 U.S.C. § 119 to Germany Patent Application No. 10 2024 204 327.3, filed May 8, 2024, the entire contents of which is incorporated herein by reference.

FIELD

One or more example embodiments relates to a method for controlling the temperature of an X-ray device, to an X-ray device and a computer program product.

RELATED ART

Modern computed tomography devices (CT devices) have a gantry with a rotatable frame on which, inter alia, an X-ray source for emitting X-ray radiation and an X-ray detector for detecting X-ray radiation are arranged. Current CT devices are frequently cooled with cooling air by way of a large airflow. All components of the CT device are fastened to a shared compressed air channel and thus receive the same airflow which is statically adjusted only by different ventilation holes.

Current CT devices with photon counting detectors have more specific requirements placed on the system cooling than CT devices with integrating detectors. Photon counting detectors comprise a plurality of electronic parts, in particular semiconductor sensors. The electronic parts, in particular the semiconductor sensors, are usually temperature-dependent. The output signals supplied by the electronic parts are thus also temperature-dependent. For example, a counting rate stability of the semiconductor sensors can be temperature-dependent. This can still be regulated via sensors, for example temperature sensors, and active, in particular local, heating elements, although second order effects, such as a local change in a heat dissipation capacity or temperature gradient of a heat sink design, also play a role. The problem is currently solved via active heat output control of the detectors and partially by taking into account different system states via calibration tables. A controller of the cooling air supply frequently acts as an independent control loop, which regulates an inlet temperature to a specified temperature. The design of the detector is often configured for a maximum possible and minimum available cooling capacity and has to be able to balance sometimes large differences in cooling.

SUMMARY

One or more example embodiments enable improved temperature control of at least one component of an X-ray device.

This inventively achieved by the subject matter of the independent claims. Advantageous embodiments with expedient developments are the subject matter of the subclaims. Independent of the grammatical term usage, individuals with male, female or other gender identities are included within the term.

BRIEF DESCRIPTION OF THE DRAWINGS

Exemplary embodiments of the invention are represented in the drawings and will be described in more detail below.

The same reference numerals are used in different figures for identical features. In the drawings.

DETAILED DESCRIPTION

Figures 1, 2:
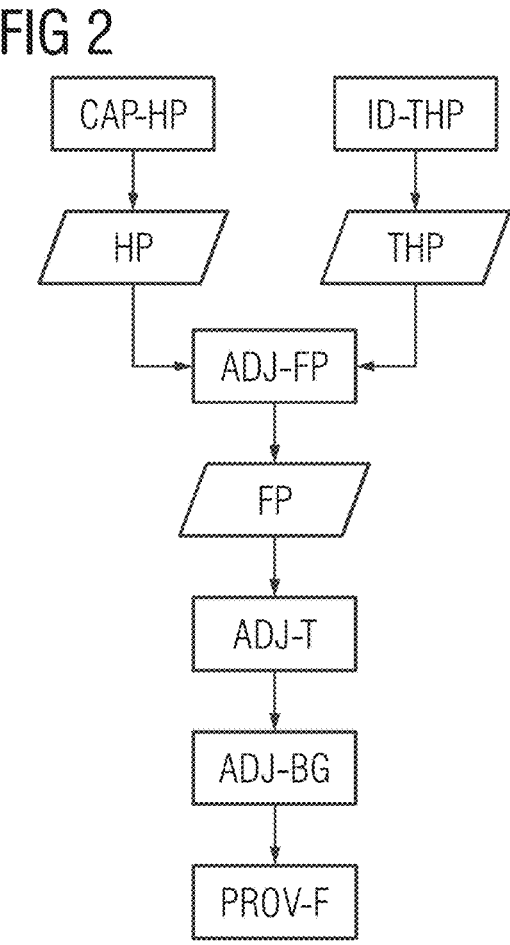
FIGS. 1 to 4 show schematic representations of different advantageous embodiments of a method for controlling the temperature of an X-ray device.

One or more example embodiments relates to a method for controlling the temperature of an, in particular medical, X-ray device. In a first step, a heating parameter of a heating element is detected. In this connection, the heating parameter characterizes a heat output instantaneously supplied to at least one component of the X-ray device via the heating element. In a further step, a target heating parameter is identified for the heating element. The target heating parameter characterizes a heat output to be supplied to the at least one component of the X-ray device via the heating element. In a further step, a fluid supply parameter of a fluid supply unit is adjusted as a function of a comparison of the heating parameter and the target heating parameter. The fluid supply unit is embodied to supply a fluid for controlling the temperature of the at least one component of the X-ray device. The fluid supply parameter comprises a specification relating to a fluid temperature and/or a quantity of fluid to be supplied per unit of time. The fluid is supplied by the fluid supply unit on the basis of the adjusted fluid supply parameter.

Hereinafter, controlling the temperature describes, in particular, cooling and/or heating, for example to a predefined temperature or a predefined temperature range.

The X-ray device can have an X-ray source for emitting X-ray radiation, for example for illuminating an examination object, and an X-ray detector for detecting incident X-ray radiation. The X-ray source and the X-ray detector can be arranged in a defined arrangement relative to each other. Further, the X-ray source and the X-ray detector can be mounted to move in the defined arrangement, in particular in a rotating and/or translational manner, for example in respect of the examination object.

Advantageously, the X-ray device can have at least one component which is to be temperature controlled, for example the X-ray source and/or the X-ray detector.

The heating element can be embodied to heat the at least one component of the X-ray device by way of the supply of the heat output. The heating element can be embodied to electrically generate the heat output, in particular to electrically heat the at least one component, and/or optically generate the heat output, in particular to optically heat the at least one component. Advantageously, the heating element can comprise a heating wire for electrically generating the heat output, in particular for heating the at least one component. Alternatively or in addition, the heating element can comprise a light source for optically heating the at least one component, for example via infrared light. Advantageously, the heating element can be arranged on the at least one component or be integrated in the at least one component. Alternatively, the heating element can be arranged spaced apart from the at least one component, for example with an embodiment of the heating element as a light source for optically heating the at least one component.

The heating parameter can comprise an operating parameter of the heating element and/or a temperature parameter. The operating parameter can describe, for example, an, in particular electrical, output supplied to the heating element during operation of the heating element, for example an electric voltage and/or current. The operating parameter can characterize, in particular quantify, the heat output instantaneously supplied to the at least one component of the X-ray device via the heating element, for example a quantity of heat per unit of time. The temperature parameter can characterize an instantaneous temperature of the heating element and/or the at least one component. The heating parameter, in particular the operating and/or temperature parameter, of the heating element can be detected, in particular measured, via a sensor. The sensor can supply the heating parameter. Furthermore, the operating parameter of the heating element can be detected using a specification, for example a user input for supplying the operating parameter to the heating element.

The target heating parameter can have all features and properties of the heating parameter. In particular, the target heating parameter can have a target value and/or desired value for the heating parameter. Advantageously, the target heating parameter can be identified using a component parameter of the at least one component. The component parameter can specify a temperature range, for example an operating temperature range, for the at least one component. Identifying the target heating parameter can comprise determining, ascertaining and/or retrieving the target heating parameter.

The fluid can comprise, for example, a liquid, in particular water, and/or a gas and/or gas mixture, for example air. The fluid supply unit can be embodied to supply the fluid, in particular to the at least one component. In particular, the fluid can be supplied via the fluid supply unit on the basis of the adjusted fluid supply parameter. The fluid supply unit can comprise, for example, a pump and/or a fan and/or nozzle for supplying the fluid.

Advantageously, the fluid supply unit can be embodied to supply the fluid for controlling the temperature of the at least one component. The fluid can be supplied directly or indirectly, in particular indirectly, to the at least one component. Supplying the fluid to the at least one component can comprise the fluid flowing against and/or flowing through and/or flowing past the at least one component. Advantageously, a thermal contact can be established hereby between the at least one component and the fluid. The at least one component can be temperature-controlled with the fluid by way of heat transfer. For example, heat can be transferred from the at least one component, having a higher temperature than the fluid, to the fluid. Alternatively, heat can be transferred from the fluid, having a higher temperature than the at least one component, to the at least one component.

The fluid temperature can denote a temperature of the fluid. The quantity of fluid per unit of time can denote a volume of fluid per unit of time, in particular a flow of a quantity of fluid and/or flow of a volume of fluid. If the fluid comprises a gas mixture, for example air, the quantity of fluid per unit of time can thus indicate a volume of air per unit of time.

The fluid supply parameter can have the specification relating to the fluid temperature, in particular a desired temperature or a desired temperature range for the fluid, and/or a quantity of fluid to be supplied per unit of time, in particular the volume of fluid to be supplied per unit of time. The specification can comprise, for example, a control parameter for actuating the fluid supply unit for supplying the fluid in accordance with the fluid supply parameter.

Advantageously, the comparison of the heating parameter and the target heating parameter can comprise a comparison of an instantaneous value of the heating parameter and a value of the target heating parameter. The comparison of the heating parameter and the target heating parameter can comprise, in particular, a, in particular qualitative and/or quantitative, identification of a deviation between the heating parameter and the target heating parameter. Adjusting the fluid supply parameter as a function of the comparison of the heating parameter and the target heating parameter can comprise adjusting, in particular increasing or reducing, the specification relating to the fluid temperature and/or the quantity of fluid to be supplied per unit of time. The fluid parameter can be adjusted, in particular, as a function of the deviation between the heating parameter and the target heating parameter. For example, the fluid temperature can be increased and/or the quantity of fluid to be supplied per unit of time can be reduced if the desired heat output overshoots the instantaneous heat output. Further, the fluid temperature can be reduced and/or the quantity of fluid to be supplied per unit of time can be increased if the desired heat output undershoots the instantaneous heat output.

The proposed method can enable improved temperature control of the at least one component of the X-ray device, in particular by active regulation of the fluid temperature and/or the quantity of fluid per unit of time as a function of an instantaneous heat output of the heating element. The instantaneous heat output of and/or heat output to be supplied by the heating element can represent a direct and fast-reacting variable, in particular measured variable, for a change in the cooling behavior at the at least one component which is to be temperature controlled. In particular, via the proposed method it is possible for a substantially constant heat output to exist for different operating states of the X-ray device, thus thermally enabling a substantially constant temperature control of the immediate mechanical surroundings. Second order thermal effects, for example a change in thermal gradients, a thermal deformation of carriers and/or thermal influencing of peripheral sensors can advantageously be greatly reduced hereby. The different operating states of the X-ray device can comprise, for example, different movement states, in particular rotation states, of the defined arrangement of X-ray source and X-ray detector, for example a static or, in particular, fast rotating state, and/or different rotational speeds of a fan for supplying the fluid, for example a low or high rotational speed, and/or different fluid temperatures, for example a low or high fluid temperature, and/or a different flow of fluid, for example a low or high flow of fluid.

In a further advantageous embodiment of the proposed method, the heating parameter can have information relating to an instantaneous current for energizing the heating element.

Advantageously, the heating element can be embodied so it can be energized to supply the heat output. The heat output which can be supplied by the heating element can depend on a current of the energizing of the heating element. Advantageously, the heating parameter can have information relating to an instantaneous current, in particular an instantaneous value of the current, for energizing the heating element. Further, the target heating parameter can have a desired current, in particular a desired value of the current, for energizing the heating element. The desired current can be directly specified or ascertained, for example using a desired temperature of the at least one component.

The proposed embodiment can advantageously enable detection of the heating parameter without additional sensor, for example a temperature sensor.

In a further advantageous embodiment of the proposed method, the fluid supply unit can have a temperature control unit for controlling the temperature of the fluid which can be supplied. Temperature control of the fluid which can be supplied can be adjusted as a function of the fluid supply parameter.

The temperature control unit can be embodied for controlling the temperature, in particular for cooling and/or for heating, of the fluid which can be supplied. The temperature control unit can have, for example, a cooling element and/or a further heating element and/or a heat exchanger. Advantageously, the fluid supply unit can be embodied to supply the, in particular non-temperature-controlled, fluid to the temperature control unit. Further, the temperature control unit can be embodied to control the temperature of the fluid. Further, the fluid supply unit can be embodied to supply the temperature-controlled fluid to the at least one component.

Advantageously, the temperature control unit can be embodied to adjust the temperature control of the fluid which can be supplied as a function of the fluid supply parameter. In particular, the temperature control unit can be embodied to increase or reduce the temperature of the fluid as a function of the fluid supply parameter.

By controlling the temperature of the fluid which can be supplied, the proposed embodiment can advantageously enable, in particular in addition to the heating element, a further temperature adjustment, in particular with a reactivity over time which is different from the heating element.

In a further advantageous embodiment of the proposed method, the fluid supply unit can have a mixing valve which is embodied to add the temperature-controlled fluid to a non-temperature-controlled fluid. Adjusting the fluid supply parameter can comprise adjusting a degree of addition of the addition of the temperature-controlled fluid. Further, the mixture of the non-temperature-controlled and the temperature-controlled fluid can be supplied to the at least one component of the X-ray device.

Advantageously, the fluid supply unit can have a mixing valve, in particular also referred to as a mixer valve, which is embodied to add the temperature-controlled fluid to a non-temperature-controlled fluid. The temperature-controlled fluid can advantageously have a lower temperature than the non-temperature-controlled fluid. For example, the mixing valve can have two inputs and one output. The non-temperature-controlled fluid can be supplied via one of the inputs and the temperature-controlled fluid can be supplied via the other input. Further, the mixture of the non-temperature-controlled and the temperature-controlled fluid can be supplied via the output of the mixing valve. The mixing valve can be embodied to adjust the degree of addition, in particular a mixing ratio, of the temperature-controlled fluid to the non-temperature-controlled fluid. The degree of addition can be adjusted manually or automatically. The mixing valve can be embodied to adjust the degree of addition by adjusting, in particular reducing or increasing, a respective flowrate of at least one of the two inputs, in particular of both inputs. The temperature-controlled and the non-temperature-controlled fluid can be supplied from a shared volume, for example a room volume, with the temperature-controlled volume being temperature-controlled via the temperature control unit before being supplied to the mixing valve. Adjusting the fluid supply parameter can comprise adjusting the degree of addition of the addition of the temperature-controlled fluid. An instantaneous temperature of the non-temperature-controlled fluid can then be compared with the instantaneous temperature of the temperature-controlled fluid. Using the result of the comparison, the degree of addition can then be adjusted in such a way that the mixture of the non-temperature-controlled and the temperature-controlled fluid has a specified fluid temperature. Adjusting the degree of addition of the addition of the temperature-controlled fluid can comprise increasing or reducing a quantity of fluid, in particular a volume of fluid, per unit of time of the temperature-controlled fluid in respect of a quantity of fluid, in particular of a volume of fluid, per unit of time of the non-temperature-controlled fluid. If the temperature-controlled fluid has a lower temperature compared to the non-temperature-controlled fluid, the fluid temperature of the supplied fluid can be increased by reducing the degree of addition of the temperature-controlled fluid, for example, if the desired heat output overshoots the instantaneous heat output. Alternatively, the fluid temperature of the supplied fluid can be reduced by increasing the degree of addition of the temperature-controlled fluid, for example if the desired heat output undershoots the instantaneous heat output.

The proposed embodiment can advantageously enable an energy-efficient temperature adjustment of the fluid which can be supplied.

In a further advantageous embodiment of the proposed method, the fluid can comprise a gas or a gas mixture. Further, the fluid supply unit can have a fan for supplying the fluid. A rotational speed of the fan for adjusting the quantity of fluid supplied per unit of time can be adjusted as a function of the fluid supply parameter.

Advantageously, the fluid can comprise a gas or gas mixture, for example air. The fluid supply unit can comprise a fan, for example a nozzle and/or a rotor and/or propeller, which is embodied to intake the fluid at a first side of the fluid supply unit via under pressure and to supply it at a second side of the fluid supply unit via overpressure. The quantity of fluid which can be supplied per unit of time can be, in particular, proportional to a rotational speed of the fan. Advantageously, the rotational speed of the fan for adjusting the quantity of fluid supplied per unit of time can be adjusted as a function of the fluid supply parameter. In particular, the rotational speed of the fan can be increased to increase the quantity of fluid supplied per unit of time and can be reduced to reduce the quantity of fluid supplied per unit of time.

The proposed embodiment can advantageously enable a direct adjustment of the supplied quantity of fluid per unit of time.

In a further advantageous embodiment of the proposed method, the X-ray device can have at least one further component. A temperature control parameter can be identified for the at least one further component, which characterizes an instantaneous temperature control requirement of the at least one further component. Advantageously, the fluid supply parameter can be adjusted additionally as a function of the at least one temperature control parameter. The at least one component of the X-ray device can be prioritized with respect to the at least one further component of the X-ray device when adjusting the fluid supply parameter.

Advantageously, the X-ray device can have at least one further component, in particular a plurality of further components. The at least one further component can be identical to or different from the at least one component. The at least one further component can comprise, for example, an X-ray tube, a power pack and/or a generator. Advantageously, a temperature control parameter can be identified, in particular specified, ascertained and/or determined for the at least one further component. In particular, one temperature control parameter in each case can be identified for the plurality of further components. The respective temperature control parameter of the at least one further component can characterize an instantaneous temperature control requirement of the at least one further component. The instantaneous temperature control requirement can describe an instantaneous target temperature and/or an instantaneous target temperature difference of the at least one further component. Advantageously, the fluid supply parameter can be adjusted, in particular the specification relating to the fluid temperature and/or the quantity of fluid per unit of time can be adjusted, additionally as a function of the at least one temperature control parameter, in particular of the plurality of temperature control parameters, for example as a constraint of an optimization. The at least one component of the X-ray device can be prioritized, in particular weighted higher, with respect to the at least one further component of the X-ray device when adjusting the fluid supply parameter.

The proposed embodiment can enable an improved, in particular coordinated, temperature control of a plurality of components of the X-ray device, in particular of the at least one component and of the at least one further component of the X-ray device.

In a further advantageous embodiment of the proposed method, adjusting the fluid supply parameter can be limited as a function of the temperature control parameter to adjusting the specification relating to the quantity of fluid to be supplied per unit of time.

Advantageously, adjusting the fluid supply parameter can comprise adjusting the quantity of fluid to be supplied per unit of time as a function of the comparison of the heating parameter and the target heating parameter, in particular as a function of the deviation between the heating parameter and the target heating parameter, and the temperature control parameter. In addition, adjusting the fluid supply parameter can adjusting the specification relating to the fluid temperature unit of time as a function of the comparison of the heating parameter and the target heating parameter. This can advantageously ensure that the temperature control parameter is only taken into account in the adjustment, in particular optimization, of the quantity of fluid to be supplied per unit of time.

Adjusting the fluid parameter can comprise global or component-specific adjusting, in particular optimizing, of the specification relating to the fluid temperature and/or the quantity of fluid to be supplied per unit of time. For example, the specification relating to the fluid temperature and/or the quantity of fluid to be supplied per unit of time can be adjusted, in particular optimized, for the at least one component of the X-ray device. Further, the specification relating to the quantity of fluid to be supplied per unit of time can be adjusted, in particular optimized, for the at least one further component of the X-ray device.

The proposed embodiment can advantageously enable improved coordination of the temperature control of the at least one component and the at least one further component by taking into account the respective temperature control requirements. Independent or coordinated control, in particular regulation, of the fluid temperature and the quantity of fluid per unit of time can be enabled in the process.

In a further advantageous embodiment of the proposed method, the fluid supply parameter can be adjusted by additionally taking into account a characteristic over time of the heat output of the heating element.

Advantageously, a characteristic over time, in particular a time gradient, of the heat output of the heating element can be identified, in particular determined, on the basis of the heating parameter and the target heating parameter of the heating element. The characteristic over time of the heat output of the heating element can comprise a variation over time, for example a raising or a lowering of the heat output, or a segment constant over time. Advantageously, the characteristic over time, in particular the time gradient, of the heat output of the heating element can be additionally taken into account when adjusting the fluid supply parameter. For example, the fluid supply parameter can specify a higher fluid temperature and/or a lower quantity of fluid per unit of time with a rise in the heat output. Alternatively, the fluid supply parameter can specify a lower fluid temperature and/or a higher quantity of fluid per unit of time with a lowering of the heat output.

The proposed embodiment can advantageously make it possible for an inertia of the regulation, and therewith overshooting and undershooting of the heat output, to be reduced.

In a further advantageous embodiment of the proposed method, adjusting the fluid supply parameter can comprise adjusting the specification relating to the fluid temperature and the quantity of fluid to be supplied per unit of time. The fluid temperature can be increased and the quantity of fluid to be supplied per unit of time reduced if the desired heat output overshoots the instantaneous heat output. Further, the fluid temperature can be reduced and the quantity of fluid to be supplied per unit of time increased if the desired heat output undershoots the instantaneous heat output.

Advantageously, adjusting the fluid supply parameter can comprise adjusting the specification relating to the fluid temperature as well as the specification relating to the quantity of fluid to be supplied per unit of time. In particular, adjusting the fluid supply parameter can comprise coordinated adjusting of the specification relating to the fluid temperature and the quantity of fluid to be supplied per unit of time. If the desired heat output overshoots, in particular exceeds, the instantaneous heat output, the fluid temperature can advantageously be increased and the quantity of fluid to be supplied per unit of time reduced. A heat transfer from the at least one component to the temperature-controlled fluid can be reduced hereby. If the desired heat output undershoots the instantaneous heat output, the fluid temperature can advantageously be reduced and the quantity of fluid to be supplied per unit of time increased. A heat transfer from the at least one component to the temperature-controlled fluid can be increased hereby.

The proposed embodiment can enable improved temperature control of the at least one component of the X-ray device. This can take account of the fact that if a higher rotational speed is required by at least one further component, this request has priority. In order to still keep heat output at the at least one component constant for this case, the fluid temperature can be adjusted by a corresponding factor, for example on the basis of a ratio of a desired rotational speed to an instantaneous rotational speed, in particular an actual rotational speed.

One or more example embodiments relates to a, in particular medical, X-ray device, which is embodied to carry out a proposed method for controlling the temperature of an X-ray device. The X-ray device has a fluid supply unit and at least one component with a heating element which is to be temperature controlled.

The X-ray device can have an X-ray source and at least one detector element, which are arranged in a defined arrangement relative to each other. Further, the defined arrangement can be mounted to move, in particular in a rotating and/or translational manner. The X-ray source can be embodied to emit X-ray radiation for fluoroscopy of an examination object arranged between the X-ray source and the at least one detector element. Further, the at least one detector element can be embodied to detect incident X-ray radiation, in particular following an interaction of the X-ray radiation with the examination object.

Advantageously, the X-ray device can be embodied as a computed tomography system (CT system) and/or C-arm X-ray device and/or O-arm X-ray device. In particular, the respective components of the X-ray device can be embodied to carry out the steps of the proposed method for controlling the temperature of a X-ray device. The X-ray device can also have a processing unit.

The X-ray device, in particular the processing unit, can be embodied to detect the heating parameter of the heating element, to identify the target heating parameter and to adjust the fluid supply parameter. Further, the fluid supply unit can be embodied to supply the fluid on the basis of the adjusted fluid supply parameter.

The advantages of the proposed X-ray device substantially correspond to the advantages of the proposed method for controlling the temperature of an X-ray device. Features, advantages or alternative embodiments mentioned in this connection can likewise also be transferred to the other claimed subject matters, and vice versa.

In a further advantageous embodiment of the proposed X-ray device, the X-ray device can have at least one detector element for detecting incident X-ray radiation as the at least one component which is to be temperature controlled.

The X-ray device can have one or more detector element(s), which are each embodied to detect incident X-ray radiation. The one or more detector element(s) can form the at least one component which is to be temperature controlled with, in particular in each case, a heating element.

In a further advantageous embodiment of the proposed X-ray device, the fluid supply unit can have a temperature control unit for controlling the temperature of the fluid which can be supplied as a function of the fluid supply parameter.

In a further advantageous embodiment of the proposed X-ray device, the fluid supply unit can have a mixing valve which is embodied to add the temperature-controlled fluid to a non-temperature-controlled fluid as a function of the fluid supply parameter. Further, the fluid supply unit can be embodied to supply the mixture of the non-temperature-controlled fluid and the temperature-controlled fluid to the at least one component of the X-ray device.

In a further advantageous embodiment of the proposed X-ray device, the fluid supply unit can have a fan for supplying a gas or gas mixture as the fluid. A rotational speed of the fan can be adjusted as a function of the fluid supply parameter in order to adjust the quantity of fluid supplied per unit of time.

One or more example embodiments relates to a computer program product with a computer program which can be loaded directly into a memory of a processing unit, with program segments in order to carry out all steps of a proposed method for controlling the temperature of an X-ray device when the program segments are executed by the processing unit.

The computer program product can comprise software with a source code, which still has to be compiled and linked or only has to be interpreted, or an executable software code, which for execution only has to be loaded into the processing unit. The method for controlling the temperature of an X-ray device can be carried out quickly, in an identically repeatable manner and robustly by way of the computer program product via a processing unit. The computer program product is configured such that it can carry out the inventive method steps via the processing unit.

The computer program product is stored, for example, on a computer-readable storage medium or saved on a network or server from where it can be loaded into the processor of a processing unit, which can be directly connected to the processing unit or can be embodied as part of the processing unit. Furthermore, items of control information of the computer program product can be stored on an electronically readable data carrier. The items of control information of the electronically readable data carrier can be embodied in such a way that when the data carrier is used in a processing unit, they can carry out an inventive method. Examples of electronically readable data carriers are a DVD, a magnetic tape or a USB stick, on which electronically readable items of control information, in particular software, are stored. When these items of control information are read from the data carrier and stored in a processing unit, all inventive embodiments of the previously described methods can be carried out.

An implementation largely in terms of software has the advantage that even previously used processing units can be easily upgraded by way of a software update in order to work inventively. Apart from the computer program, such a computer program product can possibly comprise additional component parts, such as documentation, and/or additional components, as well as hardware components, such as hardware keys (dongles, etc.) use the software.

FIG. 1 shows a schematic representation of an advantageous embodiment of a proposed method for controlling the temperature of an X-ray device. A heating parameter HP of a heating element can be detected CAP-HP. The heating parameter HP can characterize a heat output instantaneously supplied to at least one component of the X-ray device via the heating element. Advantageously, the heating parameter can have information relating to an instantaneous current for energizing the heating element. In a further step, a target heating parameter THP can be identified ID-THP for the heating element. The target heating parameter THP can characterize a heat output to be supplied to the at least one component of the X-ray device via the heating element. In a further step, a fluid supply parameter FP of a fluid supply unit can be adjusted ADJ-FP as a function of a comparison of the heating parameter HP and the target heating parameter THP. Advantageously, the fluid supply parameter can be adjusted ADJ-FP additionally by taking into account a characteristic over time of the heat output of the heating element. The fluid supply unit can be embodied to supply a fluid for controlling the temperature of the at least one component of the X-ray device. The fluid supply parameter FP can comprise a specification relating to a fluid temperature and/or a quantity of fluid to be supplied per unit of time. Further, the fluid can be supplied PROV-F by the fluid supply unit on the basis of the adjusted fluid supply parameter FP.

Advantageously, adjusting the fluid supply parameter ADJ-FP can comprise adjusting the specification relating to the fluid temperature and the quantity of fluid to be supplied per unit of time. The fluid temperature can be increased and the quantity of fluid to be supplied per unit of time can be reduced if the desired heat output overshoots the instantaneous heat output. Further, the fluid temperature can be reduced and the quantity of fluid to be supplied per unit of time can be increased if the desired heat output undershoots the instantaneous heat output.

FIG. 2 shows a schematic representation of a further advantageous embodiment of a proposed method for controlling the temperature of an X-ray device. Advantageously, the fluid supply unit can have a temperature control unit for controlling the temperature of the fluid which can be supplied. Temperature control of the fluid which can be supplied can be adjusted ADJ-T as a function of the fluid supply parameter FP. Advantageously, the fluid supply unit can have a mixing valve, which is embodied to add the temperature-controlled fluid to a non-temperature-controlled fluid. Adjusting the fluid supply parameter ADJ-FP can comprise adjusting a degree of addition ADJ-BG of the addition of the temperature-controlled fluid. The mixture of the non-temperature-controlled and the temperature-controlled fluid can be supplied PROV-F to the at least one component of the X-ray device.

Figures 3, 4:
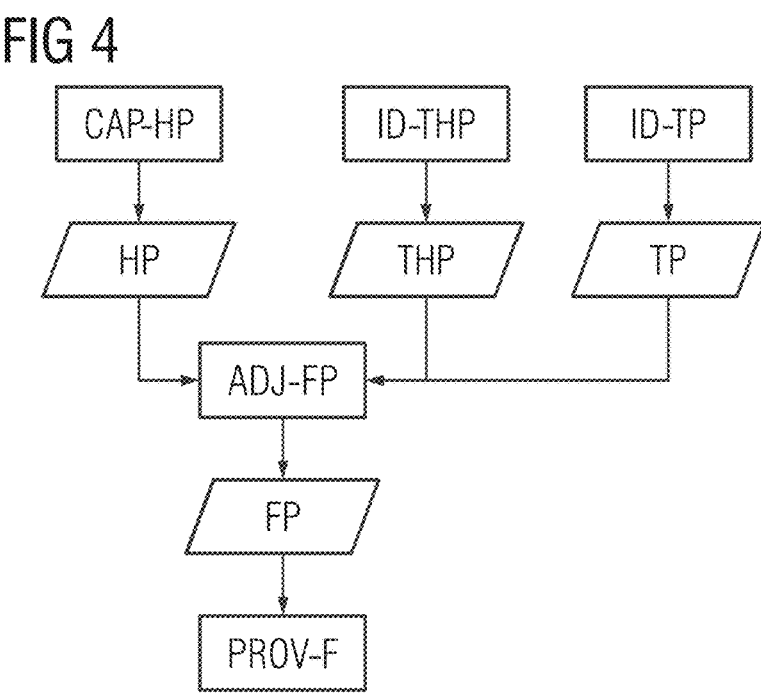

FIG. 3 shows a schematic representation of a further advantageous embodiment of a proposed method for controlling the temperature of an X-ray device. The fluid can comprise a gas or gas mixture. Further, the fluid supply unit can have a fan for supplying the fluid. Advantageously, a rotational speed of the fan can be adjusted ADJ-DZ as a function of the fluid supply parameter FP in order to adjust the quantity of fluid supplied per unit of time.

FIG. 4 shows a schematic representation of a further advantageous embodiment of a proposed method for controlling the temperature of an X-ray device. The X-ray device can have at least one further component. Further, a temperature control parameter TP can be identified ID-TP for the at least one further component, which characterizes an instantaneous temperature control requirement of the at least one further component. The fluid supply parameter ADJ-FP can be adjusted additionally as a function of the at least one temperature control parameter TP. In addition, the at least one component of the X-ray device can be prioritized with respect to the at least one further component of the X-ray device when adjusting the fluid supply parameter ADJ-FP. Advantageously, adjusting the fluid supply parameter ADJ-FP can be limited as a function of the temperature control parameter to an adjustment of the specification relating to the quantity of fluid to be supplied per unit of time.

Figure 5:
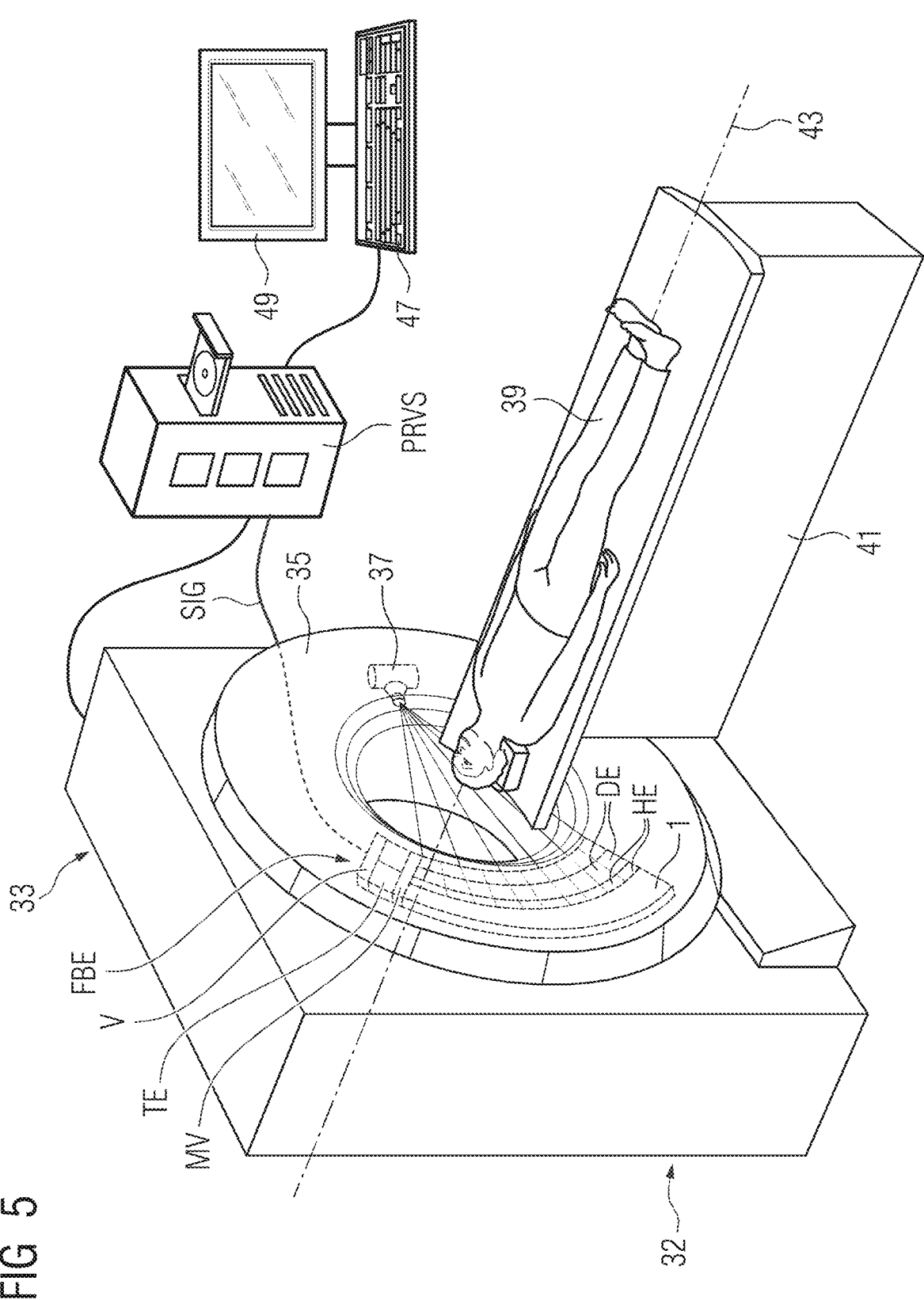
FIG. 5 shows a schematic representation of an advantageous embodiment of a proposed X-ray device.

FIG. 5 shows a schematic representation of an advantageous embodiment of a proposed X-ray device as the medical CT-device 33. The CT device 33 can comprise the X-ray source 37, a detector unit 1 with a plurality of detector elements DE and a processing unit PRVS. The X-ray source 37 and the detector unit 1, in particular the plurality of detector elements DE, can be arranged opposite each other. The X-ray source 37 can be embodied to emit X-ray radiation. In particular, the X-ray source 37 can be embodied to illuminate the detector elements DE with X-ray radiation along an X-ray direction of incidence. The detector elements DE can in each case be embodied to detect the X-ray radiation.

The CT device 33 can also comprise a gantry 32 with a rotor 35. The X-ray source 37 and the detector unit 1 can be arranged on the rotor 35 in a defined arrangement, in particular integrated in the rotor 35 or secured to the rotor 35. The rotor 35 can be mounted to rotate about a rotational axis 43. The examination object 39 to be mapped can be supported on the patient-supporting apparatus 41 and moved through the gantry 32 along the rotational axis 43. The processing unit PRVS can be used to control the CT device 33 and to calculate sectional images or volume images of the examination object 39.

The CT device 33 can also have a fluid supply unit FBE which is embodied to supply a fluid to at least one component of the CT device 33 which is to be temperature controlled. Advantageously, the processing unit PRVS can be embodied to detect the heating parameter CAP-HP of the heating element HE. Further, the processing unit PRVS can be embodied to identify the target heating parameter ID-THP for the heating element. Furthermore, the processing unit PRVS can be embodied to adjust the fluid supply parameter ADJ-FP of the fluid supply unit FBE as a function of the comparison of the heating parameter HP and the target heating parameter THP. The fluid supply unit FBE can be embodied to supply the fluid for controlling the temperature of the at least one component of the CT device 33. Further, the fluid supply unit FBE can be embodied to supply PROV-F the fluid to the at least one component on the basis of the adjusted fluid supply parameter FP. Advantageously, the detector elements DE can form the at least one component which is to be temperature controlled. The fluid supply unit FBE can also have a temperature control unit TE for controlling the temperature of the fluid which can be supplied as a function of the fluid supply parameter FP. In addition, the fluid supply unit FBE can have a mixing valve MV which is embodied to add the temperature-controlled fluid to a non-temperature-controlled fluid as a function of the fluid supply parameter FP. The fluid supply unit FBE can be embodied to supply PROV-F the mixture of the non-temperature-controlled and the temperature-controlled fluid to the at least one component of the CT device 33. Furthermore, the fluid supply unit FBE can have a fan V for supplying a gas or gas mixture as the fluid. A rotational speed of the fan V for adjusting the quantity of fluid supplied per unit of time can be adjusted ADJ-DZ as a function of the fluid supply parameter FP.

The processing unit PRVS can be embodied to control the fluid supply unit FBE, in particular its respective components, for example via a signal SIG. In particular, the processing unit PRVS can be embodied to control the fan V, the temperature control unit TE and/or the mixing valve MV.

An input facility 47, for example a keyboard, and an output facility 49, for example a screen and/or display, can be connected to the processing unit PRVS, in particular coupled in terms of signaling. The input facility 47 can advantageously be integrated in the output facility 49, for example in the case of an, in particular resistive and/or capacitive, input display. A user input for controlling the CT device 33 can be detected via the input facility 47. Further, the output facility 49 can be embodied to display a graphic representation of items of information and/or parameters of the CT device 33.

The schematic representations in the described figures are not to scale and do not depict any size ratios.

In conclusion, it will be pointed out once again that the methods described in detail above and the represented apparatuses are merely exemplary embodiments which can be modified in a wide variety of ways by a person skilled in the art without departing from the scope of the invention. Furthermore, use of the indefinite article "a" or "an" does not preclude the relevant features from also being present multiple times. Similarly, the terms "unit" and "element" do not preclude the relevant components from being composed of a plurality of cooperating sub-components which can possibly also be spatially distributed.

In the context of the present application, the expression "on the basis of" can be understood, in particular, within the meaning of the expression "by using". In particular, wording, according to which a first feature is generated (alternatively: ascertained, determined, etc.) on the basis of a second feature, does not preclude the first feature from being generated (alternatively: ascertained, determined, etc.) on the basis of a third feature.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a Graphics Processing Unit (GPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A method for controlling a temperature of an X-ray device, comprising:
    detecting a heating parameter of a heating element, wherein the heating parameter characterizes a heat output instantaneously supplied to at least one component of the X-ray device via the heating element;
    identifying a target heating parameter for the heating element, wherein the target heating parameter characterizes a heat output to be supplied to the at least one component of the X-ray device via the heating element; and
    adjusting a fluid supply parameter of a fluid supply unit as a function of a comparison of the heating parameter and the target heating parameter, wherein
        the fluid supply unit is configured to supply a fluid to control the temperature of the at least one component of the X-ray device,
        the fluid supply parameter comprises a specification relating to at least one of a fluid temperature or a quantity of fluid to be supplied per unit of time, and
        the fluid is supplied by the fluid supply unit based on the adjusted fluid supply parameter.

2. The method of claim 1, wherein the heating parameter includes information relating to an instantaneous current to energize the heating element.

3. The method of claim 2, wherein
    the fluid comprises a gas or gas mixture,
    the fluid supply unit includes a fan configured to supply the fluid, and
    a rotational speed of the fan is adjusted to adjust a supplied quantity of fluid per unit of time as a function of the fluid supply parameter.

4. The method of claim 3, wherein
    the X-ray device includes at least one further component,
    a temperature control parameter for the at least one further component is identified, the temperature control parameter for the at least one further component characterizes an instantaneous temperature control requirement of the at least one further component,
    the fluid supply parameter is additionally adjusted as a function of the at least one temperature control parameter, and
    the at least one component of the X-ray device is prioritized with respect to the at least one further component of the X-ray device when adjusting the fluid supply parameter.

5. The method of claim 4, wherein the adjusting only adjusts the specification relating to the quantity of fluid to be supplied per unit of time.

6. The method of claim 5, wherein the fluid supply parameter is additionally adjusted based on a characteristic over time of the heat output of the heating element.

7. The method of claim 6, wherein
the adjusting the fluid supply parameter comprises the specification relating to the fluid temperature and the quantity of fluid to be supplied per unit of time,
the fluid temperature is increased and the quantity of fluid to be supplied per unit of time is reduced if a desired heat output overshoots the instantaneous heat output, and
the fluid temperature is reduced and the quantity of fluid to be supplied per unit of time is increased if the desired heat output undershoots the instantaneous heat output.

8. The method of claim 1, wherein
the fluid supply unit includes a temperature control unit configured to control the temperature of the fluid to be supplied, and
temperature control of the fluid to be supplied is adjusted as a function of the fluid supply parameter.

9. The method of claim 8, wherein
the fluid supply unit includes a mixing valve configured to add temperature-controlled fluid to a non-temperature-controlled fluid,
the adjusting adjusts a degree of addition of the addition of the temperature-controlled fluid, and
a mixture of the non-temperature-controlled and the temperature-controlled fluid is supplied to the at least one component of the X-ray device.

10. The method of claim 1, wherein
the fluid comprises a gas or gas mixture,
the fluid supply unit includes a fan configured to supply the fluid, and
a rotational speed of the fan is adjusted to adjust a supplied quantity of fluid per unit of time as a function of the fluid supply parameter.

11. The method of claim 1, wherein
the X-ray device includes at least one further component,
a temperature control parameter for the at least one further component is identified, the temperature control parameter for the at least one further component characterizes an instantaneous temperature control requirement of the at least one further component,
the fluid supply parameter is additionally adjusted as a function of the at least one temperature control parameter, and
the at least one component of the X-ray device is prioritized with respect to the at least one further component of the X-ray device when adjusting the fluid supply parameter.

18

12. The method of claim 11, wherein the adjusting only adjusts the specification relating to the quantity of fluid to be supplied per unit of time.

13. The method of claim 1, wherein the fluid supply parameter is additionally adjusted based on a characteristic over time of the heat output of the heating element.

14. The method of claim 1, wherein
the adjusting the fluid supply parameter comprises the specification relating to the fluid temperature and the quantity of fluid to be supplied per unit of time,
the fluid temperature is increased and the quantity of fluid to be supplied per unit of time is reduced if a desired heat output overshoots the instantaneous heat output, and
the fluid temperature is reduced and the quantity of fluid to be supplied per unit of time is increased if the desired heat output undershoots the instantaneous heat output.

15. An X-ray device configured to perform the method of claim 1, the X-ray device comprising:
a fluid supply unit; and
the at least one component.

16. The X-ray device of claim 15, further comprising:
at least one detector element configured to detect incident X-ray radiation as the at least one component which is to be temperature controlled.

17. The X-ray device of claim 15, wherein the fluid supply unit includes a temperature control unit configured to control the temperature of the fluid to be supplied as a function of the fluid supply parameter.

18. The X-ray device of claim 17, wherein
the fluid supply unit includes a mixing valve configured to add a temperature-controlled fluid to a non-temperature-controlled fluid as a function of the fluid supply parameter, and
the fluid supply unit is configured to supply a mixture of the non-temperature-controlled and the temperature-controlled fluid to the at least one component of the X-ray device.

19. The X-ray device of claim 15, wherein
the fluid supply unit has a fan configured to supply a gas or gas mixture as the fluid, and
a rotational speed of the fan is adjustable to adjust the supplied quantity of fluid per unit of time as a function of the fluid supply parameter.

20. A non-transitory computer program product including program segments, when executed by at least one processing unit, cause the at least one processing unit to perform the method of claim 1.

* * * * *